Figure 3:
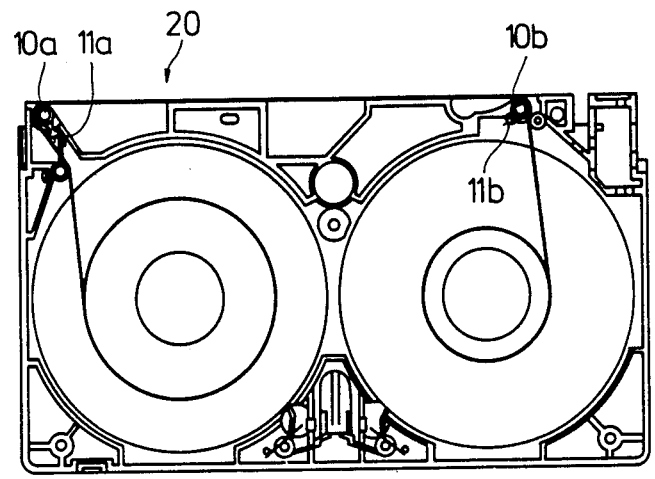

United States Patent [19]

Schoettle et al.

[11] Patent Number: 4,736,904
[45] Date of Patent: Apr. 12, 1988

[54] TAPE GUIDE MEANS FOR A TAPE TO BE TRANSPORTED, IN PARTICULAR IN A MAGNETIC TAPE CASSETTE OR IN A TAPE TRANSPORT APPARATUS

[75] Inventors: Klaus Schoettle, Heidelberg; Lothar Gliniorz, Frankenthal; Kurt Schmidts, Kehl; Eugen Kamm, Appenweier; Herbert Dietze, Berghaupten; Wulf Muenzner, Frankenthal; Dieter Gaiser, Rheinau; Artur Buhk, Erpolzheim; Juergen Dreyer, Ruelzheim, all of Fed. Rep. of Germany

[73] Assignee: BASF Aktiengesellschaft, Ludwigshafen, Fed. Rep. of Germany

[21] Appl. No.: 813,231

[22] Filed: Dec. 24, 1985

[30] Foreign Application Priority Data

Dec. 24, 1984 [DE] Fed. Rep. of Germany ....... 8438028
Jun. 5, 1985 [DE] Fed. Rep. of Germany ....... 8516444

[51] Int. Cl.$^4$ .................. G11B 15/32; B65H 27/00; B65H 23/04
[52] U.S. Cl. ..................... 242/199; 242/76; 226/196
[58] Field of Search ............ 242/76, 157 R, 197–200; 226/196–199; 360/132

[56] References Cited

U.S. PATENT DOCUMENTS

| | | | |
|---|---|---|---|
| 3,658,227 | 4/1972 | Stephans | 226/196 |
| 3,889,900 | 6/1975 | Nelson | 242/199 |
| 3,991,956 | 11/1976 | Machida | 242/199 |
| 4,168,043 | 9/1979 | Shiba | 242/199 |
| 4,228,940 | 10/1980 | Umehara | 226/196 |
| 4,313,551 | 2/1982 | Umehara | 226/196 |
| 4,399,960 | 8/1983 | Shoji | 242/199 |
| 4,429,823 | 2/1984 | Umehara | 226/196 |
| 4,437,222 | 3/1984 | Umehara | 29/527.4 |

FOREIGN PATENT DOCUMENTS

| | | |
|---|---|---|
| 2431969 | 2/1975 | Fed. Rep. of Germany . |
| 2535276 | 2/1977 | Fed. Rep. of Germany . |
| 2722509 | 11/1978 | Fed. Rep. of Germany . |
| 2817318 | 11/1978 | Fed. Rep. of Germany . |
| 2840069 | 3/1979 | Fed. Rep. of Germany . |
| 2808998 | 9/1979 | Fed. Rep. of Germany . |
| 3100453 | 12/1981 | Fed. Rep. of Germany . |
| 3201444 | 8/1982 | Fed. Rep. of Germany . |
| 3218097 | 12/1982 | Fed. Rep. of Germany . |
| 1584630 | 2/1981 | United Kingdom . |
| 2143208 | 2/1985 | United Kingdom . |

*Primary Examiner*—David Werner
*Attorney, Agent, or Firm*—Keil & Weinkauf

[57] ABSTRACT

A guide means for tapes to be transported, in particular in tape cassettes or tape apparatus, comprises a support element and a flexible guide strip, in particular one made of metal foil, fixed on this, and at least one holding element for the end sections of the flexible guide strip. The guide strip possesses a predetermined thickness and may be drop-shaped or pear-shaped in the operating position. The tape guide means may also comprise a support element whose surface is at least partially cylindrical and a flexible guide strip which is fastened thereon. As a separable unit which can be preassembled, the tape guide means can therefore also be employed for automatic manufacture. The tape guide means can be used for tape guides which are either stationary or movable within limits, in the field of tape-like recording media, such as films, magnetic tapes, punched tapes, etc.

10 Claims, 7 Drawing Sheets

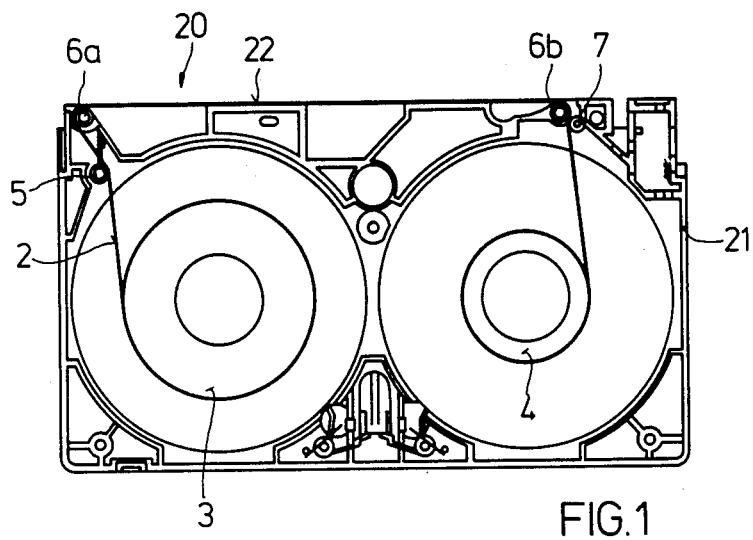
FIG.1
PRIOR ART
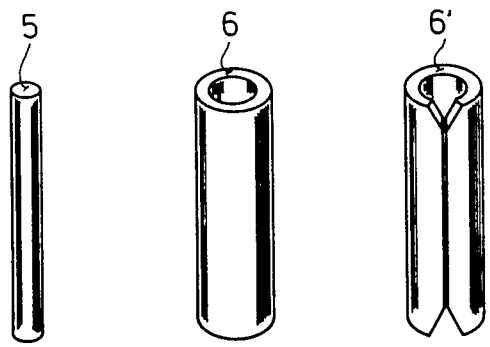
FIG.2a
PRIOR ART
FIG.2b
PRIOR ART
FIG.2c
PRIOR ART

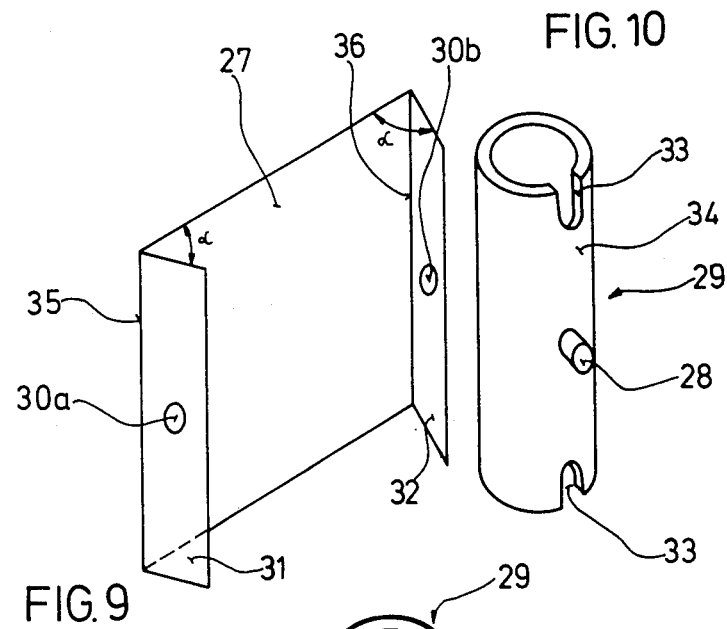
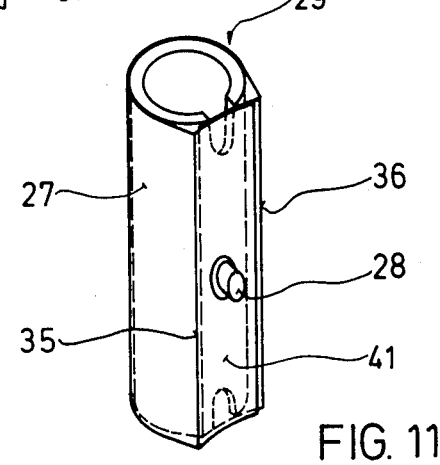

TAPE GUIDE MEANS FOR A TAPE TO BE TRANSPORTED, IN PARTICULAR IN A MAGNETIC TAPE CASSETTE OR IN A TAPE TRANSPORT APPARATUS

The present invention relates to tape guide means for a tape to be transported, in particular, but not exclusively, a magnetic tape of the kind comprising a stationary flexible guide strip which forms the guide surface for the tape to be guided and which is arranged on a support element which is at least partly dimensionally stable and has a defined surface. The invention also relates to a tape cassette or a tape transport provided with such tape guide means.

Tape guides, in particular stationary guides, for thin, flexible, smooth, strip-like tapes, in particular magnetic tapes in cassettes and/or apparatuses for holding or for guiding the tapes in a frictionless manner without damage during transportation of the tape, for example during rewinding, recording and playback, are known.

For such tapes, a large number of different guide elements are known, the object of all such guide elements being to hold and/or to guide the tape in a particular position, shape or path when stationary and/or during motion, so that the desired operations can be carried out on or with the tape. Wherever it is possible to do so, the skilled worker uses for these purposes rotatably mounted cylindrical rolls which, when properly designed, permit virtually frictionless, wear-free and energy-saving tape movement. However, in many cases, for example in compact cassettes and/or tape apparatuses produced in large amounts, stationary tape guides having relatively small diameters have to be used for reasons relating to tape flutter and/or to space and cost, etc..

For VHS video cassettes, German Laid-Open Application DOS No. 2,817,318 discloses guides comprising hollow metallic cylindrical elements which are made by bending a strip of sheet metal of considerable thickness and are provided with one or more incisions to permit engagement of an antirotation projection of the cassette housing. The manufacture of this hollow cylinder from the strip has no substantial advantages of a functional or economic nature. Processing part of the surface of the hollow cylindrical element is also not advisable since, where the guide elements have small diameters, a whole cylindrical surface can be processed more readily and more rapidly than only a part of this surface using a conventional processing machine (for example an apparatus for centerless grinding).

German Published Application DAS No. 2,431,969 discloses a tape cassette which has a fixed fastening pin and a sleeve, the latter having a concave surface and being resilient so that it is resiliently deformed compared with its normal shape when pushed onto the fastening pin and is held on the pin by means of friction and spring forces. The production of this sleeve presents some difficulties due to its concave surface and its closed annular shape. In order to mount or fasten the sleeve in the correct position, it is necessary to provide the sleeve with an additional end flange as a reference surface.

German Pat. No. 2,535,276 discloses a tape guide of comparatively large surface area, which consists of a fixed basic structure and, fastened thereto, a springy metal strip of considerable thickness which strip is deformed in the range governed by Hook's law and is fastened under tensile stress. Fastening under tensile stress is effected to produce a concave guide surface for the magnetic tape. With this known tape guide, it is also intended to form a curved guide surface using a sufficiently thin strip material, for which purpose the surface of the support element must have a suitable shape so that the strip under tension fits closely on it in the desired manner. In practice, this strip consists of V2A stainless steel and is 0.4 mm (400 μm) thick.

It is an object of the present invention to provide tape guide means which, in spite of the fact that it has to meet high requirements with regard to abrasion resistance and fine surface structure, can be produced substantially more economically and mounted more easily than known tape guide means. It is a further object of the present invention to provide tape cassettes or tape apparatus possessing tape guide means of this type.

We have found that these objects are achieved, according to the invention, by a tape guide means of the kind referred to wherein the flexible guide strip has a length greater than that of the peripheral contour of the support element and has a thickness of not more than 150 μm, so that the shape of the guide surface is determined exclusively by the shape of the support element and/or the surface thereof, and wherein at least one dimensionally stable holding element is provided to hold projecting end sections of the flexible guide strip to prevent turning of the latter relative to the support element.

Consequently, the requirements which tape guides, particularly those in tape cassettes, have to meet can easily be satisfied, and low friction, little tape wear, a low level of tape errors and trouble-free running of the tape are achieved even over extremely long service lives. In particular, it is possible to produce very flat guide surfaces having a set surface roughness, without the need for extremely expensive processing to achieve this purpose.

The flexible guide strip is advantageously between from 10 μm to 15 μm thick. To facilitate fastening, the flexible guide strip suitably comprises a springy material.

In practice, the flexible guide strip can be held by jamming it on the support element and/or on the holding element.

Advantageously, the surface of the support element is at least partly cylindrical.

The holding element may simply possess a slot or groove, and may be in particular a slotted cylindrical element, in order to hold end sections of the flexible guide strip. It is also possible to use two spaced apart holding projections. In a tape cassette, a part of the holding element or the entire holding element can consist of a housing wall. The holding elements in the cassette are advantageously produced on the cassette housing by injection molding.

Conveniently end sections of the flexibe guide strip can be connected to one another, permitting simple insertion into the at least one holding element after production. The end sections may also be connected by providing a curvature of each end section from the longitudinal axis, facilitating clamping on the holding element. Advantageously the flexible guide strip may be arranged to have an omega shape or form, although a drop shape or pear shape in the inserted position is also advantageous.

Alternatively end sections of the flexible guide strip may be provided with fastening openings, making it simple to fasten the flexible guide strip on the support element. In practice, the support element may be provided with a fastening slot, which at the same time permits securing against rotation. The support element may be produced as a separate part made, for example, of polystyrene. Hence, the support element can be produced very economically as a mass produced article. Conveniently, a pin arranged radially and axially in the middle is provided as a holding element on the support element. Advantageously, the support element and the flexible guide strip can be in the form of a unit capable of being preassembled.

The guide means of the present invention may be incorporated in tape cassettes or other tape transport apparatus.

Figures 4A, 4B, 4C:
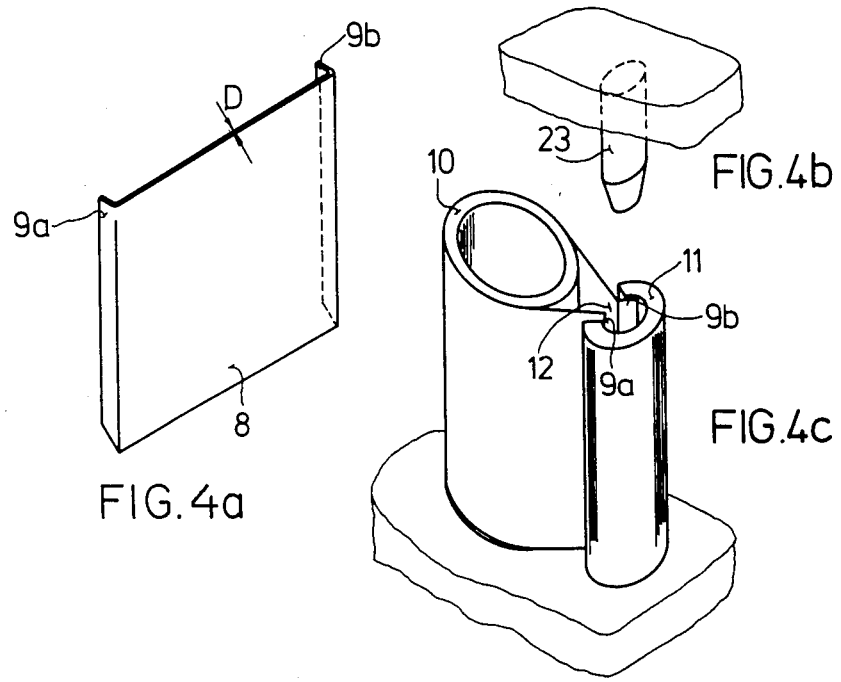
Figure 5A:
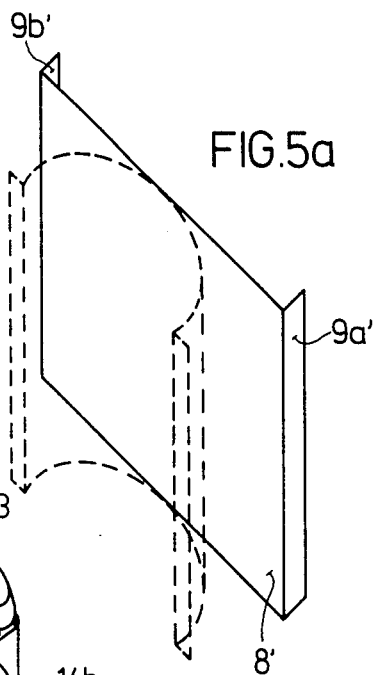
Figure 5B:
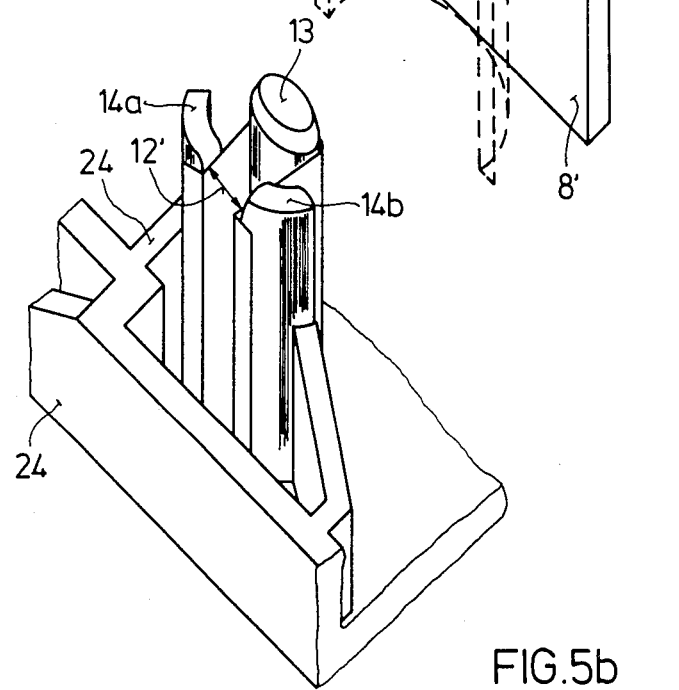
Figure 6A:
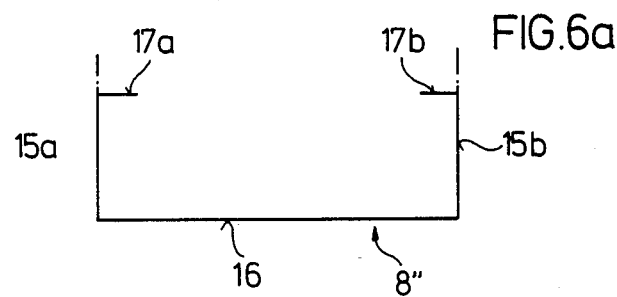
Figure 6B:
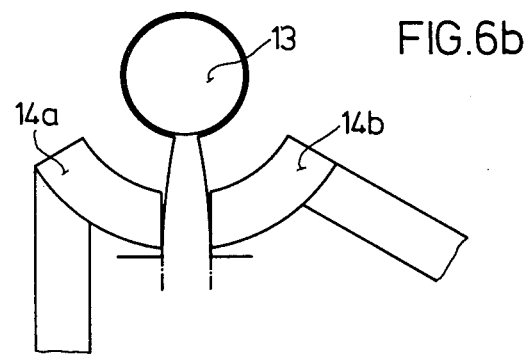
Figure 7:
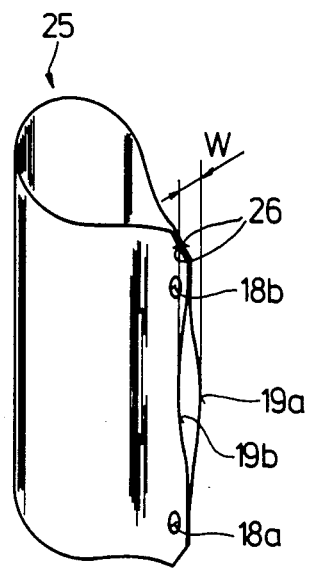
Figure 8:
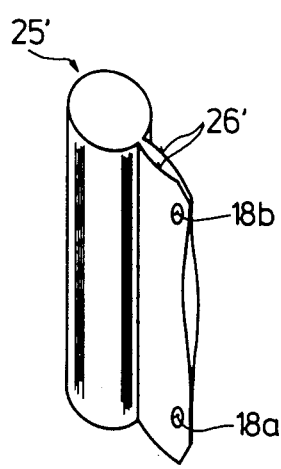
Figure 12:
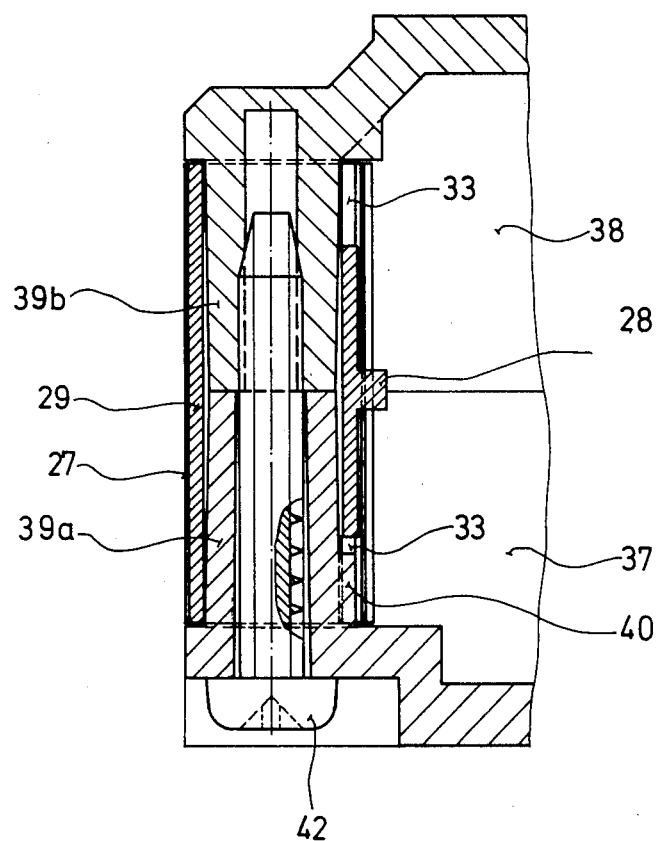

Embodiments of the invention will now be described, by way of example, with reference to the accompanying drawings, in which FIG. 1 is a view inside a conventional video cassette, FIGS. 2a to 2c show conventional tape guide elements, FIG. 3 is a view inside a tape cassette incorporating tape guide means according to the present invention, FIGS. 4a to 4c show a flexible guide strip, a securing part and a mounted guide element, of the tape guide means shown in FIG. 3, FIGS. 5a and 5b show a second embodiment of tape guide means according to the invention, FIGS. 6a and 6b show a third embodiment of tape guide means according to the invention, FIGS. 7 and 8 show further embodiments of tape guide means according to the invention with the flexible guide elements having connected together end sections, FIGS. 9 and 10 show a flexible guide strip and a hollow cylindrical element, respectively, of a further embodiment of tape guide means according to the invention, FIG. 11 shows the guide element and cylindrical element of FIGS. 9 and 10 in a preassembled form, and FIG. 12 shows the preassembled unit of FIG. 11 inserted and fastened in a tape transport apparatus, in particular a magnetic tape cassette.

FIG. 1 shows a typical tape path in a conventional VHS video cassette 20. The tape 2, when travelling, for example, from reel 3, is fed over a stationary cylindrical metal pin 5 (FIG. 2a). The pin 5 is pressed into a corresponding depression formed in the plastic cassette housing 21 and the coated side of the tape is arranged to be in contact with the metal pin. Thereafter, the tape 2 is guided around a guide 6a, which is likewise stationary, and fed along the front 22 of the cassette as far as guide 6b. The guides 6a and 6b usually consist of hollow metallic cylinders without seams (FIG. 2b) or are made by bending a sheet metal strip to form a hollow cylinder (6' in FIG. 2c; according to German Laid-Open Application DOS No. 2,817,318). From the guide 6b, the tape 2 is fed past a nip roll 7 to reel 4, on which it is wound.

Experience has shown that the surfaces of the stationary guides 5, 6a and 6b have to meet high requirements since otherwise excessive friction, tape wear and an increase in the number of errors can occur, and in extreme cases the tape may come to a stop. These requirements relate in particular to the abrasion resistance, the regularity, the fine surface structure and the surface roughness of the guides. On the other hand, the guides must also be protected from corrosion. All these requirements together can only be met by using expensive, corrosion-resistant material, for example stainless steel ceramic (German Laid-Open application DOS No. 3,218,097) or plated material (e.g. German Laid-Open Application DOS No. 3,100,453 and German Published Application DAS No. 2,840,069) and carrying out expensive preliminary and subsequent processing, for example diameter-turning, grinding, lapping and polishing.

On the other hand, guide elements possessing strips of plastic with friction-reducing additives, such as graphite, etc. (e.g. German Laid-Open Application DOS No. No. 2,722,509), or with added surfactants (German Laid-Open Application DOS No. 3,201,444) have been disclosed. These guide elements give the desired surface characteristics even when produced by injection molding. However, tests have shown that, when such guides are used in conventional video cassettes, trouble-free tape operation can be achieved for only a relatively short time since the plastic is worn away and/or smoothed by the tape after a few hours of operation to such an extent that the friction increases again. This may result in the tapes coming to a stop as a result of adhesion, known as sticking effect.

The disadvantages of the conventional tape guides are avoided with tape guides according to the present invention, various embodiments of which are described below.

FIG. 3 shows tape guide means 10a and 11a and 10b and 11b, which correspond to the conventional guide elements 6a and 6b in the arrangement in cassette 20.

FIGS. 4a to 4c are perspective views of various components of a novel guide element 10a or 10b on a magnified scale. In particular a flexible guide strip consists of foil material, for example a metal foil 8, and possesses bent-over or folded-over outer edges 9a and 9b, shaped by, for example, bending. The strip or foil is pressed together to transform it from its open position (see FIG. 4a) into a bow-like shape (see FIG. 4c), and is placed over a post 10. The strip or foil is pressed together to form a drop shape or pear shape the smaller end of which has a diameter somewhat smaller than the diameter of the post 10. To facilitate mounting of the bent metal foil or strip 8, the post 10 may be provided with an insertion bevel (not illustrated), and as a rule may be slightly higher or lower than the width of the metal foil or strip 8 (e.g. about half as high as this width). A holding element, in the form of a slotted hollow cylinder 11 here, is provided in the direct vicinity of the post 10. The slot 12 is at least a little wider than twice the thickness D of the flexible guide strip 8.

The bent-over outer edges 9a and 9b engage the slotted hollow cylinder 11, are supported by this and hook into the insides of the slot 12. Even where the spring action of the flexible guide strip 8 is very small, the latter fits around the post 10, covering, and hence compensating, any unintentional irregularities in the post surface which are due to the injection molding procedure. This is one of the advantages of the novel tape guide means, since it makes it possible to dispense with an expensive procedure for processing the post 10 to produce a very exact tape guide surface.

Usually, the slotted hollow cylinder 11 is chosen to be about the same height as the post 10. However, tests have shown that the flexible guide strip is still sufficiently secured in its position when the slotted hollow cylinder 11 is only about half as high as the post 10. The flexible guide strip may also be inserted or jammed between the upper and lower parts of the cassette housing (where relevant).

FIG. 4b shows a securing pin 23 which has a slightly conical end and can be fastened to the lid part of the housing 21, e.g. molded as an integral part of the said lid part. The flexible guide strip 8 engaged in the opening of the slotted hollow cylinder 11 may, if desired, be additionally fixed with the said pin.

FIG. 5 shows a tape guide means as a substitute for the guide pin 5 (FIG. 1). Here, too, the novel guide means consists of a pin 13 forming an integral part of the housing 21, and flexible guide strip 8' is bent around this pin (FIG. 5a shows an intermediate shape of the strip 8' illustrated by a dashed line) and hooked with its bent-over outer edges 9a', 9b' between holding elements, in this case holding projectrons 14a and 14b, mounted on housing 21. The lower dimensional limit given above for slot 12 applies to the disctance 12' between holding projections 14a and 14b. The latter advantageously form an integral part of lateral housing walls 24. Otherwise, the walls themselves, or slots or grooves in the inner wall parts of the housing 21, may also be used for holding purposes.

It is also possible for the holding elements to be in the form of separate clamping elements which clamp together the ends of the guide element.

Another advantageous form of tape guide means according to the invention is shown in FIG. 6b, where flexible guide strip 8" consists of a middle part 16, which is chosen to be slightly shorter in length than the circumference of the pin 13. The bent-over edges 15a and 15b which extend from the flexible guide strip 8' are in turn supported against projections 14a and 14b. In this form, the flexible guide strip 8", possibly as a result of a spring action, automatically fits closely around the major part of the pin circumference and cannot slip, even when the ends of the flexible guide strip are not bent over further (17a/b for hooking on the housing projections 14a/b). This embodiment requires the use of a springy material, which is not necessary for the other embodiments.

FIGS. 7 and 8 show other embodiments of tape guide means according to the invention which differ from the previous embodiments in that the end sections 26, 26' of flexible guide strip 25, 25' are connected to one another, for example by point welding or another conventional oining method, e.g. beading the ends, etc., prior to assembly. In an advantageous form, the end sections 26, 26' are connected at the top and bottom at points 18a/b, and the middle parts 19a and 19b of the end sections 26 are bent away from one another or from their longitudinal axis so that the curved part w is slightly larger than the width of the slot 12 of the slotted hollow cylinder 11, or slightly larger than the distance 12' between the spaced apart projections 14a and 14b.

In the embodiments comprising end sections 26 or 26' connected to one another, connection to, or fixing on, housing 21 via slots or grooves can be achieved in a variety of ways. Incisions in the bottom and/or lid parts of the housing 21 may also be sufficient for this purpose.

In practice, a tape guide means according to the invention is exceptional in that it offers considerable economic advantages. For example, compared with a tape guide as shown in FIG. 2b, the saving of material alone is more than 80% when a 30 μm thick metal foil is used as a flexible guide strip, and still higher when a 20 μm foil is employed. Moreover, the invention also has advantages with regard to the logistics and assembly, since the flexible guide strip can be acquired in the form of a roll and can particularly advantageously be processed in an automatic manufacturing procedure.

Advantageously, the flexible guide strip material used is commercial, drawn or rolled, high-alloy, springy non-magnetic stainless steel typically having a tensile strength of from 500 N/m to 1200 N/m and a surface roughness $R_z$ of <2 μm, preferably <1 μm. A metal foil of this type is advantageously used in such a way that the rolling or drawing direction is parallel to the direction of tape travel. Surface-drawn and/or surface-rolled foils are particularly advantageous because, inter alia, they do not possess any.points or sharp surface roughness, which helps very considerably in avoiding damage to the running tape. It is of course also possible to use other metal foils. In the case of particularly high requirements, or where a cheaper material is used, the metal foils may also be subjected to a preliminary special surface treatment, e.g. plating, lapping, polishing, lubrication, etc. If special, non-sharp surface structures are desired, these can be imprinted continuously on the metal foil in a simple manner.

The novel tape guide means can of course also be produced using a plastics film. Examples of suitable plastics films are those made of very strong and resistant plastics, such as polyamideimides, polyetherimides, polysulfones, polyphenylene sulfides, etc.

The thickness of the flexible guide strip material is no more than 150 μm, preferably no more than 100 μm, and, in practice, is advantageously from 10 μm to 80 μm, most preferably from 10 μm to 50 μm. Metal foils 30 μm and 20 μm thick have proven excellent, although it is also possible to use other materials of different thicknesses. These thicknesses ensure that microstructures on post 10 or 13 which are due to coarse processing are covered by the flexible guide strip, so that a high-quality surface can be obtained in a simple manner. The thickness may also be chosen so that macrostructures, for example a pattern on the post, appears through on the outside, for example in order to produce an intentional waviness of the guide surface. Furthermore, specific tape guide cross-sectional contours (i.e. shapes) can be coarsely produced by shaping the post and can be refined or compensated by mounting the flexible guide strip. In any case, a metal foil of from. 10 μm to 80 μm, for example a spring steel foil, always ensures that the guide strip is sufficiently flexible. In the case of other materials, these ranges may differ but are in any case below 150 μm.

The support elements and holding elements according to the present invention can be formed on one or more housing parts, such as pegs, pins, walls, etc., or can be supported on these parts.

Another embodiment of guide means according to the invention is shown in FIGS. 9 to 12. FIG. 9 shows a metal foil strip 27 which is cut, for example, from a metal foil tape, punched, and bent over once adjacent to each of its ends 31 and 32. The bending angle α is preferably smaller than 90° and greater than 45°. Preferably, holes 30 are located in the middle of the ends 31 and 32.

The support element is cylindrical and is shown as support sleeve 29 in FIG. 10. This sleeve 29 is typically made from a plastics material which can be produced economically and readily processed by injection molding, e.g. polystyrene. Two cutouts 33, as fastening slots, and a radially projecting, short peg 28 are advantageously arranged on a generatrix of the outer surface of the sleeve.

In mounting the metal foil strip 27 on the support sleeve 29, for example, the opening 30a is first hooked onto the peg 28, the metal foil strip 27 is then wound around the outer cylindrical surface 34 of the support sleeve 29 and the other end of the said strip is then likewise hooked onto peg 28 at the opening 30b, as shown in FIG. 11. The metal foil 27 is sufficiently springy at the bending or folding edges 35 and 36 to permit this operation to be carried out easily so that the metal foil 27, after being hooked over peg 28, is automatically engaged so that it cannot be lost and can only be removed using tools.

The tape guide means preassembled in this manner can then be introduced into a magazine and fed to the cassette assembly apparatus for automatic mounting. There, it can be pushed onto, for example, a hollow peg 39a in the lower cassette housing part 37 shown as a cut-away section in FIG. 12. This hollow peg 39a possesses, for example, at the foot of that side of it which faces away from the tape path, a projection 40 which engages a slot 33 of the support sleeve 29 and prevents this from turning relative to the support element, the hollow peg 39a. There are of course also other possible methods of securing to prevent turning, for example a method in which an appropriately shaped housing rib (not shown) comes into contact with the flattened surface 41 of the fastened metal foil strip 27 or with the peg 28 of the support sleeve 29.

After the metal foil guide has been mounted in the lower housing part 12, the upper housing part 38 together with the upper hollow peg 39b is placed on top and, for example, screwed on with screws 42.

In practice, it is also possible to insert the support sleeve 29 with the foil strip 27 in a circular groove in the lower housing part 37, and such a groove may, if required, also be present in the upper part 38. Of course, in these cases too sleeve 39 can be fixed in practice by means of screws.

The structure of the novel tape guide element, consrsting of a metal foil strip and a support element which can be separated from the tape transport apparatus, has the advantage that substantial modifications to the tape transport apparatus, in particular a tape cassette, are not required. Preassembly on the support elements, in particular the support sleeves, requires, for example, only slight modifications to the cassette housing, which can easily be made subsequently to existing molds. The sleeves can be mounted using conventional automatic machines.

Although the tape guide means described primarily constitute or subsequently supplement stationary tape guide elements, they can also be used just as advantageously to produce movably arranged guides, for example pivotable or slideable guides.

Further embodiments within the scope of the knowledge of a skilled worker, special methods of fastening, surface structures, clamping cohnections, combinations of a plurality of guide elements by one or more common flexible guide strips, etc. are possible, and the claims also embrace these.

Within the scope of the present invention, modifications to the support element, e.g. structures, rings, etc. are also possible, as are different versions of similar suitable materials, in particular plastics, such as different versions of foils or strips with or without surface structures, different expansion coefficients, etc.

The tape guide means of the present invention can be advantageously used for tape guides which are either stationary or movable within limits, in the field of tape-like recording media, such as films, magnetic tapes, punched tapes, etc.

We claim:

1. Guide means for a tape to be transported, in particular in a magnetic tape cassette, consisting of a flexible guide strip which is stationary on an at least partly dimensionally stable support element having an at least partly cylindrical surface as a guide surface for the tape, said flexible guide strip having a length greater than that of the peripheral contour of the support element, said flexible guide strip having projecting end sections and a thickness of not more than 150 $\mu$m, so that the shape of the guide surface is determined primarily by the shape and surface of the support element, and by a slotted cylindrical element for holding said projecting end sections as to prevent turning at the flexible guide strip relative to the support element.

2. Tape guide means as claimed in claim 1, wherein the flexible guide strip is from about 10 to 50 $\mu$m thick.

3. Tape guide menas as claimed in claim 1, wherein the guide strip consistas of a springy material.

4. Tape guide means as claimed in claim 1, wherein the guide strip is held by being jammed onto the support element and/or holding element.

5. Tape guidemeans as claimed in claim 1 wherein the flexible guide strip is shaped so that it has an omega form in cross-section.

6. Guide mean for a tape to be transported, in particular in a magnetic tape cassette, consisting of a flexible guide strip which is stationary on an at least partly dimensionally stable support element having an at least partly cylindrical surfce as a guide surface for the tape, said flexible guide strip having length greater than that of the peripheral contour of the support element, said flexible guide strip having projecting end sections and a thickness of not more than 150 $\mu$m, so that the shape of the guide surface is determined primarily by the shape and surface of the support element, and by two spaced apart projections arranged to hold said projecting end sections as to prevent turning of the flexible guide strip relative to the support element.

7. Guide means for a tape to be transported, in particular in a magnetic tape cassette, consisting of a flexible guide strip which is stationary on an at least partly dimensionally stable support element having an at least partly cylindrical surface and forming the guide surface for the tape, said flexible guide strip having a length greater than that of the peripheral contour of the support element, said flexible guide strip having projecting end sections and a thickness of not more than 150 $\mu$m, so that the shape of the guide surface is determined primarily by the shape and surface of the support element, and by at least one dimensionally stable holding element having a slot or groove provided to hold said projecting end sections of the flexible guide strip which are connected together so a to prevent turning of the flexible guide strip relative to the support element, the end sections of the flexible strip are connected in such a way that each end section is curved away from its longitudinal axis.

8. Tape guide means as claimed in claim 7, wherein the flexible guide strip has a drop shape or pear shape when held by the holding element.

9. Guide means for a tape to be transported, in particular in a magnetic tape cassette, consisting of a flexible guide strip which is stationary on an at least partly dimensionally stable support element having a defined surface and forming the guide surface for tape, wherein the flexible guide strip has a length greater than that of the peripheral contour of the support element, said flexible guide strip having projecting end sections and a thickness of about 10 to 50 μm, so that shape of the guide surface is determined primarily by the shape and the surface of the support element, at least one dimensionally stable holding element is provided to hold said projecting end sections of the flexible guide strip so as to prevent turning of the flexible guide strip relative to the support element, the support element has an at least partly cylindrical outer surface axially and a radial peg is provided centrally on said support element as said holding element, said projecting end sections of the flexible guide strip being provided with fastening openings for being engaged by said radial peg.

10. Tape guide means as claimed in claim 9, wherein the at least partly cylindrical support element and the guide strip form a unit which can be preassembled.

* * * * *